United States Patent
Tani et al.

(10) Patent No.: US 12,087,942 B2
(45) Date of Patent: Sep. 10, 2024

(54) NONAQUEOUS ELECTROLYTE SECONDARY BATTERY

(71) Applicant: Panasonic Intellectual Property Management Co., Ltd., Osaka (JP)

(72) Inventors: Yuji Tani, Osaka (JP); Junichi Sakamoto, Osaka (JP); Nobuhiko Hojo, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 533 days.

(21) Appl. No.: 17/442,058

(22) PCT Filed: Mar. 23, 2020

(86) PCT No.: PCT/JP2020/012765
§ 371 (c)(1),
(2) Date: Sep. 22, 2021

(87) PCT Pub. No.: WO2020/203420
PCT Pub. Date: Oct. 8, 2020

(65) Prior Publication Data
US 2022/0173389 A1 Jun. 2, 2022

(30) Foreign Application Priority Data
Mar. 29, 2019 (JP) .................. 2019-067637

(51) Int. Cl.
*H01M 4/38* (2006.01)
*H01M 4/02* (2006.01)
(Continued)

(52) U.S. Cl.
CPC .......... *H01M 4/386* (2013.01); *H01M 4/133* (2013.01); *H01M 4/134* (2013.01); *H01M 4/364* (2013.01);
(Continued)

(58) Field of Classification Search
None
See application file for complete search history.

(56) References Cited

U.S. PATENT DOCUMENTS

2016/0285101 A1* 9/2016 Yoshio .................. H01M 4/364
2016/0329557 A1* 11/2016 Sugimori .............. H01M 4/483
(Continued)

FOREIGN PATENT DOCUMENTS

| CN | 106575751 A | 4/2017 |
| CN | 106797020 A | 5/2017 |

(Continued)

OTHER PUBLICATIONS

Machine Translation of JP 2016110876A (Year: 2016).*
(Continued)

*Primary Examiner* — Gregg Cantelmo
(74) *Attorney, Agent, or Firm* — WHDA, LLP

(57) ABSTRACT

A non-aqueous electrolyte secondary battery, wherein a negative electrode includes a negative electrode mixture layer having a thickness T and a negative electrode current collector, the negative electrode active material includes carbon and Si-containing materials, wherein when the negative electrode mixture layer is divided into a first region having a thickness of T/2 on the surface side of the negative electrode and a second region having a thickness of T/2 on the negative electrode collector side, a mass ratio of the first to the second composite material contained in the first region is >1, a mass ratio of the first composite to the second composite material contained in the second region is <1, and, in a fully charged condition, an open circuit potential of the negative electrode is 0 V or more and 70 mV or less with respect to a lithium metal.

9 Claims, 2 Drawing Sheets

(51) Int. Cl.
| | |
|---|---|
| *H01M 4/133* | (2010.01) |
| *H01M 4/134* | (2010.01) |
| *H01M 4/36* | (2006.01) |
| *H01M 4/48* | (2010.01) |
| *H01M 4/485* | (2010.01) |
| *H01M 4/587* | (2010.01) |
| *H01M 10/0525* | (2010.01) |
| *H01M 10/42* | (2006.01) |

(52) U.S. Cl.
CPC ........... *H01M 4/483* (2013.01); *H01M 4/485* (2013.01); *H01M 4/587* (2013.01); *H01M 10/0525* (2013.01); *H01M 2004/027* (2013.01); *H01M 2010/4292* (2013.01)

(56) References Cited

U.S. PATENT DOCUMENTS

| | | |
|---|---|---|
| 2017/0125806 A1 | 5/2017 | Wang et al. |
| 2017/0214041 A1 | 7/2017 | Minami et al. |
| 2019/0214635 A1 | 7/2019 | Sugimori et al. |

FOREIGN PATENT DOCUMENTS

| | | | | |
|---|---|---|---|---|
| JP | 2016-091649 A | | 5/2016 | |
| JP | 2016110876 A | * | 6/2016 | ............ A47C 9/005 |
| JP | 2018-56066 A | | 4/2018 | |
| JP | 2018-63920 A | | 4/2018 | |
| WO | 2018/043188 A1 | | 3/2018 | |
| WO | 2019/239652 A1 | | 12/2019 | |

OTHER PUBLICATIONS

English Translation of International Search Report dated Jun. 2, 2020, issued in counterpart Application No. PCT/JP2020/012765. (2 pages).

English Translation of Chinese Search Report dated Sep. 27, 2023 for the related Chinese Patent Application No. 202080025840.7. (3 pages).

* cited by examiner

NONAQUEOUS ELECTROLYTE SECONDARY BATTERY

TECHNICAL FIELD

The present invention relates to a non-aqueous electrolyte secondary battery using a negative electrode including a Si-containing material.

BACKGROUND ART

Non-aqueous electrolyte secondary batteries, especially lithium-ion secondary batteries, are expected as a power source for small consumer applications, power storage devices and electric vehicles because of their high voltage and high energy density. With the need for high-energy density of batteries, the use of silicon (Si) containing materials alloying with lithium is expected as a negative electrode active material with a high theoretical capacity density.

For example, PTL1 proposes a method for producing a negative electrode material for a lithium-ion secondary battery preparing base particles made of a material containing silicon atoms, and forming a carbon coating film on the surface of the base particles to form a coated particles, wherein, as the base particles, silicon particles, particles having a composite structure in which fine particles of silicon are dispersed in a silicon-based compound, silicon oxide particles represented by the general formula $SiO_x$ ($0.5 \leq x \leq 1.6$), or mixtures thereof.

CITATION LIST

Patent Literature

[PTL 1] Japanese Laid-Open Patent Publication No. 2016-91649

SUMMARY OF INVENTION

Technical Problem

To increase the capacity of non-aqueous electrolyte secondary batteries, it is effective to increase the utilization rate of the negative electrode. However, when the utilization rate of the negative electrode is increased, the utilization rate of Si in the silicon-containing material increases, so that the open-circuit potential of the negative electrode at a fully charged condition decreases to 70 mV or less with respect to a lithium-metal. When such deep charging is performed on Si, deterioration of the Si-containing material tends to proceed, making it difficult to obtain sufficient cycle characteristics. It is considered that the deterioration of the Si-containing material is accelerated by the crystal region of Si reacting with lithium.

Solution to Problem

In view of the foregoing, one aspect of the present disclosure relates to a non-aqueous electrolyte secondary battery including: a positive electrode; a negative electrode; an electrolyte; and a separator disposed between the positive electrode and the negative electrode; the negative electrode including: a negative electrode mixture layer having a thickness T including a negative electrode active material; and a negative electrode current collector carrying the negative electrode mixture layer; the negative electrode active material including a carbon material and a Si-containing material; the Si-containing material including a first composite material and a second composite material that is different from the first composite material; and the first composite material including a silicon oxide phase and first Si particles dispersed in the silicon oxide phase. When the negative electrode mixture layer is divided into a first region having a T/2 thickness on the surface side of the negative electrode and a second region having a T/2 thickness on the negative electrode current collector side, a ratio of a mass w11 of the first composite material contained in the first region to a mass w12 of the second composite material contained in the first region: w11/w12 is larger than 1, a ratio of a mass w21 of the first composite material contained in the second region to a mass w22 of the second composite material contained in the second region: w21/w22 is less than 1, and an open circuit potential of the negative electrode at a fully charged condition is 0 V or more and 70 mV or less with respect to a lithium metal.

Advantageous Effects of Invention

According to the present invention, the cycle characteristics of the non-aqueous electrolyte secondary battery using a negative electrode containing a Si-containing material is improved.

While the novel features of the invention are set forth in the appended claims, the invention relates both to configuration and content and will be better understood by the following detailed description taken in conjunction with other objects and features of the invention and collating the drawings.

DESCRIPTION OF EMBODIMENTS

Figure 1:
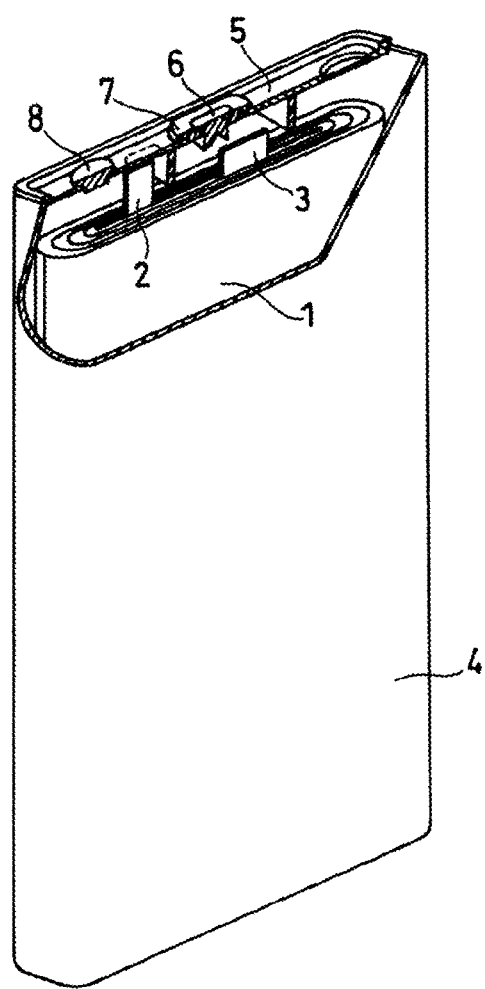
FIG. 1 A partially notched schematic oblique view of a non-aqueous electrolyte secondary battery of one embodiment of the present invention.

The non-aqueous electrolyte secondary battery according to an embodiment of the present invention includes a positive electrode, a negative electrode, an electrolyte, and a separator disposed between the positive electrode and the negative electrode. The negative electrode includes a negative electrode mixture layer containing a negative electrode active material and having a thickness T, and a negative electrode current collector carrying the negative electrode mixture layer. The thickness T of the negative electrode mixture layer may be determined, for example, by measuring the thickness at arbitrarily selected 10 positions of the negative electrode mixture layer and averaging the measured values. When the negative electrode mixture layer is carried on both surfaces of the negative electrode current collector, the thickness T is the thickness of the negative electrode mixture layer per one side.

The negative electrode active material includes a carbon material and a Si-containing material, and the Si-containing material includes a first composite material and a second composite material different from the first composite material. Here, the carbon material refers to a carbon material capable of absorbing and releasing lithium ions electrochemically.

The first composite material includes a silicon oxide phase and first Si particles dispersed in the silicon oxide phase. The first composite material is excellent in that the stability is high and the volume change is small among the Si-containing materials. It is considered that the high stability is due to that the particle diameter of the first Si particles dispersed in the silicon oxide phase is small and deep charge hardly proceeds. In addition, in the silicon oxide phase, there are relatively many sites that irreversibly trap lithium ions, and therefore, the irreversible capacity tends to increase among the Si-containing materials. In other words, the first composite material may have a larger irreversible capacity than the second composite material. Trapping of lithium ions by the silicon oxide phase is considered to contribute to the suppression of the volume change together with enhancing the stability of the structure of the first composite material.

The first composite material can be obtained, for example, by heating a silicon oxide in a non-oxidizing atmosphere having an inert gas such as argon and performing a disproportionation reaction. In the disproportionation reaction, Si microcrystals can be uniformly produced in the silicon oxide phase. The size of the Si particles generated by the disproportionation reaction is small, and for example, the average particle diameter can be less than 100 nm, and can be in the range of 5 nm to 50 nm. The main component of the silicon oxide phase (e.g., 95 to 100 mass %) can be silicon dioxide. That is, the first composite material may include a $SiO_2$ phase and Si particles dispersed in the $SiO_2$ phase. In this instance, the first composite material, as a whole, can be represented by the general formula $SiO_x$ ($0 \leq x \leq 2$).

The content of the first Si particles contained in the first composite material may be, for example, 20 mass % or more and 60 mass % or less. Thus, it is easy to achieve both high capacity and improved cycle characteristics of the battery.

The negative electrode is designed so that the open-circuit potential become 0 V or more and 70 mV or less with respect to a lithium metal at a fully charged condition. The open circuit potential at the fully charged condition may be 60 mV or less with respect to the lithium metal, and may be 50 mV or less. The lower the open-circuit potential at the fully charged condition, the higher the negative electrode utilization and the deeper silicon is charged.

The fully charged condition refers to, when the rated capacity of the battery is denoted as C, for example, a state in which the battery is charged until the state of charge (SOC) becomes $0.98 \times C$ or more. The open-circuit potential of the negative electrode at a fully charged condition may be measured by disassembling a battery in a fully charged condition in an argon atmosphere to take out the negative electrode and assembling a cell using the negative electrode and a lithium-metal as a counter electrode. The non-aqueous electrolyte of the cell may be the same composition as that of the non-aqueous electrolyte in the disassembled battery, and for example, the liquid electrolyte used in Example 1 described later may be used as a model liquid electrolyte.

Here, when the negative electrode mixture layer is divided into a first region having a thickness of T/2 on the surface side of the negative electrode and a second region having a thickness of T/2 on the negative electrode current collector side, a ratio: $w11/w12$ of a mass $w11$ of the first composite material contained in the first region to a mass $w12$ of the second composite material contained in the first region is larger than 1. On the other hand, a ratio of a mass $w21$ of the first composite material contained in the second region to a mass $w22$ of the second composite material contained in the second region: $w21/w22$ is less than 1.

In other words, when the negative electrode mixture layer is divided into 2 parts at the center in the thickness direction, the first region on the surface side of the negative electrode contains a larger amount of the first composite material than the second composite material, and the second region on the negative electrode current collector side contains a smaller amount of the first composite material than the second composite material. In this case, the first composite material with high stability is utilized for the charge reaction more preferentially than the second composite material. Therefore, the deterioration of the second composite material is suppressed, and the overall deterioration of the Si-containing material is also suppressed.

The mass ratio $w11/w12$ described above can be determined, for example, by the following procedure.

First, a discharged battery in an early stage is disassembled, and the negative electrode is taken out. In the discharge state, the Si particles in the Si-containing material are in a state in which lithium ions are not absorbed. The negative electrode is washed with a non-aqueous solvent such as a liquid electrolyte or ethylene carbonate (EC) and dried. For the negative electrode after drying, cross-sectional processing of the negative electrode mixture layer is performed by cross-section polisher (CP) to obtain a sample. Field emission scanning electron microscopy (FE-SEM) is used to take a cross-section of the first region to obtain the first image (200 μm×200 μm). In order to distinguish between the carbon material and the Si-containing material, the first image is subjected to a binarization process. In the Si-containing material whose cross section can be confirmed by the first image observation, elemental analyses using an electron beam probe microanalyzer (EPMA) are performed, and a material containing a $SiO_2$ phase as a main component is assigned as the first composite material. Other Si-containing materials are assigned as the second composite material. The total area A1 of the first composite material sorted above is determined. The total area A2 of the second composite material sorted above is determined.

The total area A11 of the first composite material is regarded as the content $w11$, and the total area A12 of the second composite material is regarded as the content $w12$ in the first region, and the A11/A12 ratio is determined as the $w11/w12$ ratio.

By a similar method, the content of the first composite material and the second composite material in the second region is determined, and the $w21/w22$ ratio is determined. That is, using FE-SEM, a second image (200 μm×200 μm) of a cross section of the second region is obtained, a binarization process is performed, and in the Si-containing material in which a cross section can be confirmed, elemental analyses using an electron beam probe microanalyzer (EPMA) are performed, and a total area A21 of a material containing $SiO_2$ phase as a main component is determined as the first composite material, and a total area A22 of another Si-containing material is determined as the second composite material, and the A21/A22 ratio is obtained as the $w21/w22$ ratio.

Although the surface of the Si-containing material may be coated with a conductive layer, since the conductive layer is very thin and trace amounts, the mass thereof is ignored. Note that, $SiO_2$ phase of the first composite material absorbs lithium ions by initial charging to produce $Li_4SiO_4$ phase included therein.

The mass ratio $w11/w12$ would be sufficient if it is larger than 1, but may be 5.0 or more, and may be 10.0 or more.

On the other hand, the ratio w21/w22 would be sufficient if it is less than 1, but may be 0.5 or less, and may be 0.01 or less.

The ratio of a mass W1 of the first composite material contained in the negative electrode mixture layer to a mass W2 of the second composite material contained in the negative electrode mixture layer: W1/W2 may be, for example, from 1.0/19.0 to 19.0/1.0, and may be from 1.0/14.0 to 14.0/1.0. By using a sufficient amount of the stable first composite material as above, the overall deterioration of the Si-containing material is further suppressed, and it becomes easy to improve the cycle characteristics of the battery.

The above mass ratio W1/W2 can be determined as follows using the content w11 (total area A11) of the first composite material and the content w12 (total area A12) of the second composite material in the first region determined as described above, and the content w21 (total area A21) of the first composite material and the content w22 (total area A22) of the second composite material in the second region.

$$W1 = w11 + w21 = A11 + A21$$

$$W2 = w12 + w22 = A12 + A22$$

$$W1/W2 = (A11 + A21)/(A12 + A22)$$

Note that w11+w12 and w21+w22 can be determined by the following procedure. Specifically, a discharged battery in an initial stage is disassembled and the negative electrode is taken out. In the discharge state, the Si particles in the Si-containing material are in a state where lithium ions are not absorbed therein. After the negative electrode is washed with a non-aqueous solvent such as the liquid electrolyte or ethylene carbonate (EC) and dried, the first area of the negative electrode mixture layer is scraped off to obtain a sample of a powdery negative electrode mixture. Then, for example, X-ray photoelectron spectroscopy (XPS) is used to determine the total content of the Si-containing material in the sample (first region). Next, the second region that is the remaining negative electrode mixture layer is scraped off to obtain a sample of a powdery negative electrode mixture. Then, XPS is similarly used to determine the total content of the Si-containing material in the sample (second region).

The second composite material includes, for example, a lithium-ion conductive phase and second Si particles dispersed in the lithium-ion conductive phase. The lithium-ion conductive phase may be, for example, a silicate phase and/or a carbon phase. In other words, the second composite material may include, for example, at least one of a composite material containing a silicate phase and second Si particles dispersed in the silicate phase (hereinafter, referred to as an LSX material), and a composite material containing a carbon phase and second Si particles dispersed in the carbon phase (hereinafter, referred to as a Si—C material).

The content of the second Si particles contained in the second composite material may be, for example, 40 mass % or more and 80 mass % or less. By the above configuration, it becomes easy to achieve both high capacity and improved cycle characteristics of the battery. Unlike the first composite material which the manufacturing method to obtain is limited, the second composite material allows the design of a high-capacity negative electrode easy since the content of the second Si particles in the second composite material can be arbitrarily changed. By using the first composite material and the second composite material in combination and also controlling the distribution of them in the negative electrode mixture layer, it becomes possible to achieve both good cycle characteristics and high capacity even when the utilization rate of Si is increased.

The second composite material is excellent in that the irreversible capacity is small. This is because the silicate phase and the carbon phase do not have lots of sites that irreversibly trap lithium ions. By using the second composite material, excellent charge and discharge efficiency can be obtained. Especially, the effect is remarkable in an early stage of charge and discharge cycles. On the other hand, since the second Si particles dispersed in the silicate phase or the carbon phase can cause deep charging to proceed, the second composite material tends to be deteriorated. The ratio of the irreversible capacity C1 of the first composite material to the irreversible capacity C2 of the second composite material: C1/C2 may be greater than 1, or greater than 1.1.

The silicate phase may include, for example, at least one selected from the group consisting of group 1 elements and group 2 elements of a long period type periodic table. As the group 1 elements and the group 2 elements of the long period type periodic table, for example, lithium (Li), potassium (K), sodium (Na), magnesium (Mg), calcium (Ca), strontium (Sr), barium (Ba), or the like can be used. As other elements, aluminum (Al), boron (B), lanthanum (La), phosphorus (P), zirconium (Zr), titanium (Ti), and the like may be included. Among them, a silicate phase containing lithium (hereinafter, also referred to as a lithium silicate phase) is preferred because of its small irreversible capacity and high initial charge and discharge efficiency. That is, the second composite material may include a lithium silicate phase and second Si particles dispersed in the lithium silicate phase.

The lithium silicate phase may be an oxide phase containing lithium (Li), silicon (Si), and oxygen (O), and may contain other elements. Atomic ratio of O to Si in the lithium silicate phase: O/Si is, for example, greater than 2 and less than 4. In this case, it is advantageous in terms of stability and lithium-ion conductivity. Preferably, O/Si is greater than 2 and less than 3. Atomic ratio of Li to Si in the lithium silicate phase: Li/Si is, for example, greater than 0 and less than 4. Examples of elements other than Li, Si and O which may be contained in the lithium silicate phase include iron (Fe), chromium (Cr), nickel (Ni), manganese (Mn), copper (Cu), molybdenum (Mo), zinc (Zn), aluminum (Al), and the like.

The lithium silicate phase may have a composition represented by the formula: $Li_{2z}SiO_{2+z}$ ($0<z<2$). From the viewpoint of stability, ease of fabrication, lithium-ion conductivity, and the like, z preferably satisfies $0<z<1$, and more preferably $z=\frac{1}{2}$.

The carbon phase may include, for example, amorphous carbon having low crystallinity (i.e., amorphous carbon). The amorphous carbon may be, for example, hard carbon, soft carbon, or otherwise. Amorphous carbons can be obtained, for example, by sintering a carbon source under an inert atmosphere and pulverizing the obtained sintered body. The Si—C material can be obtained, for example, by mixing a carbon source and Si particles, stirring the mixture while crushing the mixture with a stirrer such as a ball mill, and then firing the mixture in an inert atmosphere. As the carbon source, for example, a saccharide or a water-soluble resin, such as carboxy methylcellulose (CMC), polyvinylpyrrolidone, cellulose, sucrose or the like, may be used. When the carbon source and the Si particles are mixed, for example, the carbon source and the Si particles may be dispersed in a dispersion medium such as alcohol.

The average particle diameter of the second Si particles is, for example, 100 nm or more and 500 nm or less, and may be 400 nm or less, and may be 200 nm or less. By using the second Si particles having such a large average particle diameter, it becomes possible to increase the capacity of the second composite material. Further, the change in the volume of the second Si particles during charge and discharge becomes small, and the structural stability of the second composite material is improved. Here, the average particle diameter of the second Si particles is a value after at least an elapse of the first charge.

The Si particles dispersed in the lithium-ion conductive phase is usually composed of a plurality of crystallites. The crystallite size of the Si particles is preferably, for example, 30 nm or less. In this case, since the volume change due to the expansion and contraction of the Si particles with the charge and discharge can be reduced as much as possible, the cycle characteristics are further enhanced. For example, since voids that might be formed around the Si particles during contraction of the Si particles and isolations of the Si particles caused by reduction of the contact between the Si particles and its periphery are suppressed, decrease in charge and discharge efficiency is suppressed. The lower limit value of the crystallite size of the Si particles is not particularly limited, but is, for example, 5 nm or more. The crystallite size may be 10 nm or more and 30 nm or less, and may be 15 nm or more and 25 nm or less.

The average particle diameter of the first composite material may be 2 to 10 μm and may be 4 to 7 μm. Further, the average particle diameter of the second composite material may be 6 to 15 μm, and may be 8 to 12 μm. In the above particle diameter range, since the stress due to the volume change of the Si-containing material with charge and discharge is easily relaxed, it becomes easy to obtain good cycle characteristics.

The content of the Si particles contained in the Si-containing material (each composite material) can be measured by Si-NMR. Desirable measuring conditions for Si-NMR are shown below.

Measuring device: solid-state nuclear magnetic resonance spectrum measuring device (INOVA-400), manufactured by Varian Co. Ltd.
Probing: Varian 7 mm CPMAS-2
MAS: 4.2 kHz
MAS speed: 4 kHz
Pulse: DD (45° pulse+signal capture time 1H decouple)
Repeat time: 1200 sec
Observation width: 100 kHz
Observation center: around −100 ppm
Signal uptake time: 0.05 sec
Accumulated number: 560
Sample quantity: 207.6 mg The average particle diameter of the Si particles contained in the Si-containing material (each composite material) can be measured from a cross-sectional SEM (scanning electron microscope) photograph of the Si-containing material. Specifically, the average particle diameter of the Si particles is determined by averaging the maximum diameter of arbitrarily selected 100 Si particles.

The crystallite size of the Si particles is calculated from the half-width of the diffraction peak assigned to the Si (111) plane of the X-ray diffraction (XRD) pattern of the Si particles by the equation of Sheller.

The average particle diameter of each Si-containing material (each composite material) means a particle size when the integrated volume value is 50% (volume average particle size) in the particle size distribution measured by a laser diffraction scattering method. For example, "LA-750" manufactured by Horiba Co., Ltd (HORIBA) can be used as the measuring device.

The composition of the second composite material can be analyzed, for example, by the following method.

The battery is disassembled, negative electrode is taken out, washed with a non-aqueous solvent such as ethylene carbonate, and dried, and then cross-sectional processing of the negative electrode mixture layer is performed by a cross-section polisher (CP) to obtain a sample. Field emission scanning electron microscopy (FE-SEM) is used to obtain a reflected electron image of the sample cross-section and to observe the cross-section of the second composite material. Using an Auger electron spectroscopy (AES) analyzer, qualitative and quantitative analyses of the elements may be performed on the observed second composite material (e.g., an acceleration voltage of 10 kV, a beam current of 10 nA).

For example, in the case of an LSX material represented by $Li_{2z}SiO_{2+z}$, the ratio of 2z and (2+z) may be determined from the obtained lithium (Li) content and oxygen (O) content. Note that the first composite material and the second composite material can be distinguished in the sample cross section. For example, when the Si particle diameters contained in the first composite material and the second composite material are different, they can be distinguished by the Si particle diameter. Usually, the average particle diameter of the second Si particles is larger than the average particle diameter of the first Si particles (e.g., less than 100 nm), and both of them can be easily distinguished by observing the particle diameter.

Note that, in the above-described cross-sectional observation and analyses of the sample, a carbon sample stage may be used for fixing the sample in order to prevent diffusion of Li. In order not to alter the sample cross section, a transfer vessel which holds and conveys the sample without exposure to the atmosphere may be used.

The Si-containing material may include a conductive material that coats at least a portion of its surface. It is particularly desirable that an LSX material in which the lithium-ion conductive phase is a silicate phase having poor electron conductivity be coated at their surface with a conductive material to enhance the conductivity.

The ratio of the capacity Cn of the negative electrode to the capacity Cp of the positive electrode: Cn/Cp may be greater than 0, and may be less than 1. By making the capacity ratio Cn/Cp smaller than 1, it becomes possible to remarkably increase the utilization rate of the negative electrode, which is advantageous for increasing the capacity. The capacity ratio Cn/Cp may be, for example, 0.85 to 0.99, and may be 0.9 to 0.97.

Here, each of the capacity Cn of the negative electrode and the capacity Cp of the positive electrode is the design capacity. For example, the design capacity of each electrode can be calculated from the theoretical capacity and mass of the active material contained in each electrode. The theoretical capacity means the maximum amount of electricity (also referred to as capacity density) that an active material per unit mass can store through an assumed electrochemical reaction.

The ratio of the mass Wc of the carbon material contained in the negative electrode mixture layer to the mass Ws of the Si-containing material contained in the negative electrode mixture layer: Wc/Ws may be, for example, from 70/30 to 99/1, and may be from 85/15 to 97/3. Note that, when the second composite material contains a carbon phase as the lithium-ion conductive phase, the carbon phase as the lithium-ion conductive phase is not included in the mass Wc of the carbon material.

The carbon material has a smaller degree of expansion and contraction during charge and discharge than the first composite material and the second composite material, and makes it is easy to improve the cycle characteristics. The content of the carbon material (excluding the carbon phase as the lithium-ion conductive phase) in the negative electrode active material may be, for example, 85 mass % or more and 99 mass % or less. In other words, the content of the Si-containing material in the negative electrode active material may be 1 mass % or more and 15 mass % or less. The above configuration makes it is easy to achieve both high capacity and improved cycle characteristics.

Examples of the carbon material include graphite, easily graphitized carbon (soft carbon), hardly graphitized carbon (hard carbon), and the like. Preferred among them is graphite, which is excellent in stability during charge and discharge and has small irreversible capacity. Graphite means a material having a graphite-type crystal structure, examples of which include natural graphite, artificial graphite, graphitized mesophase carbon particles. The carbon material may be used singly or in combination of two or more.

Next, the secondary battery according to an embodiment of the present invention is described. The secondary battery includes, for example, a negative electrode as follows, a positive electrode, and a liquid electrolyte.

[Negative Electrode]

The negative electrode includes a negative electrode active material capable of absorbing and releasing lithium ions electrochemically. The negative electrode includes a negative electrode current collector and a negative electrode mixture layer. The negative electrode mixture layer can be formed, for example, by coating a negative electrode slurry, in which a negative electrode mixture containing the negative electrode active material is dispersed in a dispersion medium, on a surface of the negative electrode current collector and drying it. The dry applied film may be rolled, if necessary. The negative electrode mixture layer may be formed on one surface of the negative electrode current collector, or on both surfaces thereof.

The negative electrode mixture contains a negative electrode active material as an essential component, and as an optional component, a binder, a conductive agent, a thickener, and the like can be included.

As the negative electrode current collector, a non-porous conductive substrate (metal foil, etc.), a porous conductive substrate (mesh-body, net-body, punched sheet, etc.) is used. As the material of the negative electrode current collector, stainless steel, nickel, nickel alloy, copper, copper alloy or the like can be exemplified. The thickness of the negative electrode current collector is not particularly limited, but is, for example, 1 to 50 µm, and may be 5 to 20 µm.

As the binder, resin materials that are, for example, fluorine resins such as polytetrafluoroethylene and polyvinylidene fluoride (PVDF); polyolefin resins such as polyethylene and polypropylene; polyamide resins such as aramid resins; polyimide resins such as polyimide and polyamideimide; acrylic resins such as polyacrylic acid, polymethylacrylate, and ethylene-acrylic acid copolymers; vinyl resins such as polyacrylonitrile and polyvinyl acetate; polyvinylpyrrolidone; polyethersulfone; rubbery materials such as styrene-butadiene copolymer rubber (SBR), and the like can be exemplified. These may be used singly or in combination of two or more.

Examples of the conductive agent include carbons such as acetylene black and carbon nanotubes; conductive fibers such as carbon fibers and metal fibers; carbon fluoride; metal powders such as aluminum; conductive whiskers such as zinc oxide and potassium titanate; conductive metal oxides such as titanium oxide; organic conductive materials such as phenylene derivatives, and the like. These may be used singly or in combination of two or more.

Examples of the thickener include carboxy methylcellulose (CMC) and a modified product thereof (also including salts such as a Na salt), a cellulose derivative such as methylcellulose (such as cellulose ether), a saponified product of a polymer having a vinyl acetate unit such as polyvinyl alcohol, and a polyether (such as polyalkylene oxide such as polyethylene oxide). These may be used singly or in combination of two or more.

Although not particularly limited, examples of the dispersion medium include: water; alcohols such as ethanol; ethers such as tetrahydrofuran; amides such as dimethylformamide; N-methyl-2-pyrrolidone (NMP); and a mixed solvent of these.

[Positive Electrode]

The positive electrode includes a positive electrode active material capable of absorbing and releasing lithium ions electrochemically. The positive electrode includes, for example, a positive electrode current collector, and a positive electrode mixture layer formed on a surface of the positive electrode current collector. The positive electrode mixture layer can be formed by applying a positive electrode slurry, in which a positive electrode mixture is dispersed in a dispersion medium, onto a surface of the positive electrode current collector, and drying it. The dry applied film may be rolled, if necessary. The positive electrode mixture layer may be formed on one surface of the positive electrode current collector, and may be formed on both surfaces. The positive electrode mixture contains a positive electrode active material as an essential component, and as an optional component, a binder, a conductive agent, and the like.

As the positive electrode active material, for example, a lithium-containing composite oxide can be used. $Li_aCoO_2$, $Li_aNiO_2$, $Li_aMnO_2$, $Li_aCo_bNi_{1-b}O_2$, $Li_aCo_bM_{1-b}O_c$, $Li_aNi_{1-b}M_bO_c$, $Li_aMn_2O_4$, $Li_aMn_{2-b}M_bO_4$, $LiMPO_4$, $Li_2MPO_4F$ (M is at least one selected from the group consisting of Na, Mg, Sc, Y, Mn, Fe, Co, Ni, Cu, Zn, Al, Cr, Pb, Sb and B.) can be exemplified. Here, a=0 to 1.2, b=0 to 0.9, and c=2.0 to 2.3. Note that the value "a" indicating the molar ratio of lithium is increased or decreased by charge and discharge.

Among them, a lithium-nickel composite represented by $Li_aNi_bM_{1-b}O_2$ (M is at least one selected from the group consisting of Mn, Co and Al, 0<a≤1.2, is 0.3≤b≤1.) is preferred. From the viewpoint of increasing the capacity, it is more preferable to satisfy 0.85≤b≤1. From the viewpoint of stability of the crystal structure, $Li_aNi_bCo_cAl_dO_2$ including Co and Al as M (0<a≤1.2, 0.85≤b<1, 0<c<0.15, 0<d≤0.1, b+c+d=1) is more preferred.

As the binder and the conductive agent, those exemplified for the negative electrode can be used. As the conductive agent, graphite such as natural graphite or artificial graphite may be used.

The shape and thickness of the positive electrode current collector can be selected from the shapes and ranges according to the negative electrode current collector, respectively. As the material of the positive electrode current collector, for example, stainless steel, aluminum, aluminum alloy, titanium or the like can be exemplified.

[Liquid Electrolyte]

The liquid electrolyte includes a solvent and an electrolytic salt. As the solvent, a non-aqueous solvent may be used, and water may be used. The electrolytic salt includes at least a lithium salt.

The concentration of the lithium salt in the liquid electrolyte is preferably, for example, 0.5 mol/L or more and 2 mol/L or less. By controlling the lithium salt concentration within the above range, a liquid electrolyte having excellent ionic conductivity and moderate viscosity can be obtained. However, the lithium salt concentration is not limited to the above.

As the non-aqueous solvent, for example, a cyclic carbonic acid ester (excluding an unsaturated cyclic carbonic acid ester described later), a chain carbonic acid ester, a cyclic carboxylic acid ester, a chain carboxylic acid ester, or the like is used. Examples of the cyclic carbonic acid ester include propylene carbonate (PC), ethylene carbonate (EC), and the like. Examples of the chain carbonic acid ester include diethyl carbonate (DEC), ethyl methyl carbonate (EMC), dimethyl carbonate (DMC), and the like. Examples of the cyclic carboxylic acid ester include γ-butyrolactone (GBL) and γ-valerolactone (GVL). Examples of the chain carboxylic acid ester include methyl formate, ethyl formate, propyl formate, methyl acetate, ethyl acetate, propyl acetate, methyl propionate, ethyl propionate, and propyl propionate. The non-aqueous solvent may be used singly, or two or more kinds thereof may be used in combination.

Examples of the lithium salt include $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}Cl_{10}$, lithium lower aliphatic carboxylate, LiCl, LiBr, LiI, borates, imides, and the like. Examples of the borate include lithium bis(1,2-benzenediolate(2-)-O,O') borate, lithium bis(2,3-naphthalenediolate(2-)-O,O')borate, lithium bis(2,2'-biphenyldiolate(2-)-O,O')borate, and lithium bis(5-fluoro-2-olate-1-benzenesulfonic acid-O,O') borate. Examples of the imide salt include lithium bis (fluorosulfonyl)imide ($LiN(FSO_2)_2$: hereinafter, also referred to as LFSI)), lithium bis(trifluoromethylsulfonyl) imide ($LiN(CF_3SO_2)_2$), lithium trifluoromethylsulfonyl nonafluorobutylsulfonyl imide ($LiN(CF_3SO_2)(C_4F_9SO_2)$), lithium bis(pentafluoroethylsulfonyl)imide ($LiN (C_2F_5SO_2)_2$), and the like. Among them, at least one of $LiPF_6$ and LFSI is preferred. The lithium salt may be used singly, or two or more kinds thereof may be used in combination.

The liquid electrolyte may include an additive. As the additive, succinic anhydride, maleic anhydride, ethylene sulfite, fluorobenzene, hexafluorobenzene, cyclohexylbenzene (CHB), 4-fluoroethylene carbonate (FEC), lithium bis (oxalato)borate (LiBOB), lithium difluoro(oxalato)borate (LiFOB), adiponitrile, pimeronitrile, and the like can be used. Further, a cyclic carbonic acid ester having at least one unsaturated carbon-carbon bond in the molecule (hereinafter, referred to as an unsaturated cyclic carbonic acid ester) may be included.

Examples of the unsaturated cyclic carbonic acid ester include vinylene carbonate, 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate, 4,5-diphenylvinylene carbonate, vinylethylene carbonate, and divinylethylene carbonate. One kind of the unsaturated cyclic carbonic acid ester may be used alone, and two or more kinds thereof may be used in combination. In the unsaturated cyclic carbonic acid ester, a part of the hydrogen atom may be substituted with a fluorine atom.

[Separator]

Usually, it is desirable to interpose a separator between the positive electrode and the negative electrode. The separator is excellent in ion permeability and has moderate mechanical strength and electrically insulating property. As the separator, a microporous thin film, a woven fabric, a nonwoven fabric, or the like can be used. As a material of the separator, a polyolefin such as polypropylene or polyethylene is preferred.

As an example of the structure of the secondary battery, there may be mentioned a structure in which an electrode group formed by winding the positive electrode and the negative electrode via the separator and the liquid electrolyte are housed in an outer package. Other forms of electrode groups may be applied, such as a stack electrode group in which the positive electrode and the negative electrode are laminated via the separator. The secondary battery may be in any form, for example, in cylindrical, square, coin-shaped, button-shaped, laminated or the like.

Hereinafter, the structure of a square non-aqueous electrolyte secondary battery as an example of the secondary battery according to the present invention is described, referring to FIG. 1. FIG. 1 is a schematic partially notched oblique view of a secondary battery according to an embodiment of the present invention.

The battery includes a bottomed prismatic battery case 4, and an electrode group 1 and a liquid electrolyte (not shown) housed in the battery case 4. The electrode group 1 has a long strip-like negative electrode and a long strip-like positive electrode and a separator interposed and preventing direct contact therebetween. The electrode group 1 is formed by winding the negative electrode, the positive electrode and the separator around a flat core and removing the winding core. The capacities of the positive and negative electrodes are designed such that the open-circuit potential of the negative electrode is to be 0 V or higher and 70 mV or lower relative to a lithium-metal in a fully charged condition.

One end of the negative electrode lead 3 is attached to the negative electrode current collector of the negative electrode by welding or the like. The other end of the negative electrode lead 3 is electrically connected to the negative electrode terminal 6 provided on the sealing plate 5 via an insulating plate made of resin (not shown). The negative electrode terminal 6 is insulated from the sealing plate 5 by a resin-made gasket 7. One end of a positive electrode lead 2 is attached to the positive electrode current collector of the positive electrode by welding or the like. The other end of the positive electrode lead 2 is connected to the rear surface of the sealing plate 5 via the insulating plate. That is, the positive electrode lead 2 is electrically connected to the battery case 4 serving as a positive electrode terminal. The insulating plate separates the electrode group 1 and the sealing plate 5 and separates the negative electrode lead 3 and the battery case 4. The periphery of the sealing plate 5 is fitted to the open end of the battery case 4, and the fitting portion is laser welded. Thus, the opening of the battery case 4 is sealed with the sealing plate 5. The injection hole of the liquid electrolyte provided in the sealing plate 5 is closed by the sealing plug 8.

Figure 2:
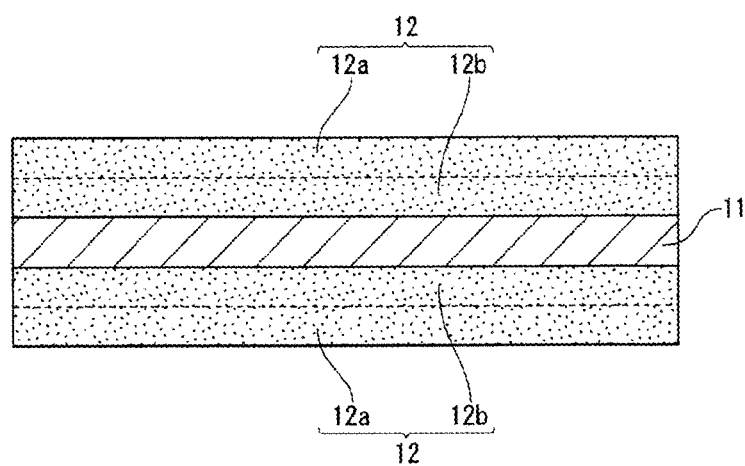
FIG. 2 A schematic cross-sectional view of a negative electrode used for a non-aqueous electrolyte secondary battery of FIG. 1.

FIG. 2 is a schematic cross-sectional view of the negative electrode used in the non-aqueous electrolyte secondary battery of FIG. 1.

The negative electrode has a negative electrode current collector 11 and a negative electrode mixture layer 12 formed on both surfaces of the negative electrode current collector 11. The negative electrode mixture layer 12 has a first region 12a on the surface side of negative electrode and a second region 12b on the side of the negative electrode current collector 11, each having a thickness (T/2) of ½ of the thickness T of the negative electrode mixture layer 12. The ratio (w11/w12) of the mass w11 of the first composite material contained in the first region to the mass w12 of the second composite material contained in the first region is designed to be larger than 1, and the ratio (w21/w22) of the mass w21 of the first composite material contained in the second region to the mass w22 of the second composite material contained in the second region is designed to be less than 1.

The present invention will be specifically described below with reference to Examples and Comparative Examples. The present invention, however, is not limited to the following Examples.

Examples 1 and 2 and Comparative Examples 1 to 5

(First Composite Material)

As the first composite material, a $SiO_x$ (x=1) with an average particle diameter of 5 μm was prepared. The $SiO_x$ includes a $SiO_2$ phase and first Si particles dispersed in the $SiO_2$ phase. The content of the first Si particles contained in the first Si containing material ($SiO_x$) was 30 mass %. The average particle diameter of the first Si particles was 20 nm.

(Second Composite Material)

As the second Si-containing material, an LSX material having an average particle diameter of 10 μm was prepared. The LSX-material includes a lithium-silicate phase represented by $Li_2Si_2O_5$ (z=0.5) and second Si particles dispersed in the lithium-silicate phase. The content of the second Si particles contained in the LSX-material was 55 mass %. The average particle diameter of the second Si particles was 100 nm. The crystallite size of the second Si particles was 15 nm.

[Preparation of Negative Electrode]

On the surface of both the first composite material ($SiO_x$) and the second composite material (LSX material), conductive layers were formed. The amount of the conductive layer was 5 mass % with respect to the total mass of each composite material and the conductive layer. Specifically, each composite material was mixed with a coal pitch, and the mixture was calcined in an inert atmosphere at 800° C., thereby the surface of each composite material was coated with a conductive carbon. Thereafter, the composite material having the conductive layer was ground and adjusted to have an average particle diameter of 10 μm using a sieve. The thickness of the conductive layer is estimated to be approximately 100 nm.

As the negative electrode active material, a first slurry and a second slurry containing the first composite material ($SiO_x$) and the second composite material (LSX material) in the proportions shown in Table 1 and containing Si-containing particles (total of the first composite material and the second composite material) and graphite in a mass ratio of 6:94 (Wc/Ws=94/6) were prepared, respectively. Each slurry was prepared by mixing the negative electrode active material, sodium carboxy methylcellulose (CMC-Na), and a styrene-butadiene rubber (SBR) at a mass ratio of 97.5:1:1.5, adding water, and then stirring the mixture using a mixer.

Next, the second slurry was applied to the surface of a copper foil so that the mass of the negative electrode mixture per 1 m² was 85 g, and the first slurry was applied on the coating film of the second slurry so as to be disposed on the surface side of the negative electrode. Thereafter, the coating film having a double layer structure was dried and then rolled to form a negative electrode mixture layer having the first region and the second region having a density of 1.5 g/cm³ on both surfaces of the copper foil to obtain a negative electrode.

TABLE 1

| | First region (First slurry) | | | Second region (Second slurry) | | | | Cell capacity | Cycle characteristics |
|---|---|---|---|---|---|---|---|---|---|
| | $SiO_x$ | LSX | w11/ w12 | $SiO_x$ | LSX | w21/ w22 | W1/ W2 | (index) | (index) |
| A1 | 100% | 0% | ∞ | 0% | 100% | 0 | 1 | 100 | 100 |
| A2 | 70% | 30% | 2.3 | 30% | 70% | 0.43 | 1 | 100 | 98 |
| B1 | 0% | 100% | 0 | 100% | 0% | ∞ | 1 | 100 | 80 |
| B2 | 50% | 50% | 1 | 50% | 50% | 1 | 1 | 100 | 87 |
| B3 | 100% | 0% | ∞ | 100% | 0% | ∞ | 1 | 80 | 99 |
| B4 | 0% | 100% | 0 | 0% | 100% | 0 | 1 | 110 | 65 |
| B5 | 30% | 70% | 0.43 | 70% | 30% | 2.3 | 1 | 100 | 85 |

[Preparation of Positive Electrode]

The lithium nickel composite oxide ($LiNi_{0.8}Co_{0.18}Al_{0.02}O_2$), acetylene black, and polyvinylidene fluoride were mixed at a mass ratio of 95:2.5:2.5, and N-methyl-2-pyrrolidone (NMP) was added thereto, followed by stirring using a mixer to prepare a positive electrode slurry. Next, the positive electrode slurry was applied to the surface of an aluminum foil, and the coating film was dried, and then rolled to prepare a positive electrode having positive electrode mixture layers having a density of 3.6 g/cm³ formed on both surfaces of the aluminum foil.

[Preparation of Liquid Electrolyte]

The liquid electrolyte was prepared by dissolving a lithium salt in a non-aqueous solvent. As the non-aqueous solvent, a mixed solvent containing ethylene carbonate (EC) and dimethyl carbonate (DMC) in a volume ratio of 30:70 was used. $LiPF_6$ was used for the lithium salt. The $LiPF_6$ concentration in the liquid electrolyte was set to 1.1 mol/L.

[Fabrication of Non-Aqueous Electrolyte Secondary Battery]

The positive electrode and the negative electrode, with a tab attached to each electrode, were wound spirally with a separator interposed therebetween such that the tabs were positioned at the outermost layer, thereby to form an electrode group. The electrode group was inserted into an exterior body made of an aluminum laminate film, vacuum-dried at 105° C. for 2 hours, and then the liquid electrolyte was injected thereinto, and the opening of the exterior body was sealed to obtain Batteries A1 and A2 of Examples 1 and 2 and Batteries B1 to B5 of Comparative Examples 1 to 5. Note that Cn/Cp ratio was designed to be 0.95 so that the open-circuit potential of the negative electrode at a fully charged condition was 70 mV with respect to a lithium-metal.

Evaluation was performed on each of Batteries prepared above by the following method.

[Evaluation 1: Cell Capacity]

For each Battery after fabrication, in an ambient of 25° C., constant current charging was performed until the voltage became 4.2 V at a current of 0.3 It, then constant voltage charging was performed until the current became 0.015 It at a constant voltage of 4.2V. Thereafter, constant current discharging was performed until the voltage reached 2.75 V at a current of 0.3 It. The pause period between charge and discharge was 10 minutes. The charge and discharge were carried out under an environment of 25° C. The discharge capacity at this time was determined as the initial capacity. Using the results of Example 1 as 100, the relative values (index) of Example 2 and each Comparative Example are shown in Table 1.

Herein, "(1/X) It" represents a current, and (1/X) It (A)=rated capacity (Ah)/X (h). X represents the time for charging or discharging the electricity corresponding to the rated capacity. For example, 0.5 It means that X=2 and the current value is represented by "rated capacity (Ah)/2 (h)".

[Evaluation 2: Cycle Capacity Maintenance Ratio]

The charge and discharge under the same conditions as in Evaluation 1 were repeated, and the ratio (percentage) of the discharge capacity at the 300th cycle to the discharge capacity at the first cycle was determined as the cycle capacity maintenance ratio. Using the result of Example 1 as 100, the relative values (index) of Example 2 and each Comparative Examples are shown in Table 1.

Examples 3 and 4 and Comparative Examples 6 to 10

As the second composite material, a Si—C material having an average particle diameter of 10 µm was prepared. The Si—C material contained an amorphous carbon phase and second Si particles dispersed in the carbon phase. The content of the second Si particles contained in the Si—C material was 50 mass %. The average particle diameter of the second Si particles was 200 nm. The crystallite size of the second Si particles was 15 nm.

Batteries A3 and A4 of Examples 3 and 4 and Batteries B6 to B10 of Comparative Examples 6 to 10 were prepared and evaluated in the same manner as in the above Examples and Comparative Examples, except that the Si—C material was used as the second composite material. Using the results of Example 3 as 100, the relative values (index) of Example 4 and each Comparative Example are shown in Table 2.

TABLE 2

| First region (First slurry) | | | | Second region (Second slurry) | | | | Cell capacity | Cycle characteristics |
|---|---|---|---|---|---|---|---|---|---|
| $SiO_x$ | Si-C | w11/w12 | $SiO_x$ | Si-C | w21/w22 | W1/W2 | (index) | (index) |
| A3 | 100% | 0% | ∞ | 0% | 100% | 0 | 1 | 100 | 100 |
| A4 | 70% | 30% | 2.3 | 30% | 70% | 0.43 | 1 | 100 | 99 |
| B6 | 0% | 100% | 0 | 100% | 0% | ∞ | 1 | 100 | 82 |
| B7 | 50% | 50% | 1 | 50% | 50% | 1 | 1 | 100 | 88 |
| B8 | 100% | 0% | ∞ | 100% | 0% | ∞ | 1 | 80 | 99 |
| B9 | 0% | 100% | 0 | 0% | 100% | 0 | 1 | 105 | 70 |
| B10 | 30% | 70% | 0.43 | 70% | 30% | 2.3 | 1 | 100 | 86 |

From Tables 1 and 2, it can be understood that the cycle characteristics can be improved when the first composite material is contained more in the first region on the surface side of negative electrode than the second composite material, and the first composite material is contained less in the second region on the negative electrode current collector side than the second composite material where the negative electrode mixture layer is divided into 2 parts at the center in the thickness direction.

Reference Examples 1 to 7

Batteries C1 to C7 of Reference Examples 1 to 7 were prepared and evaluated in the same manner as in Examples 1 and 2 and Comparative Examples 1 to 5, except that Cn/Cp ratio was designed to be 1.02 so that the open circuit potential of the negative electrode at a fully charged condition was 80 mV with respect to a lithium metal. Using the result of Reference Example 1 as 100, the relative values (index) of each Reference Examples are shown in Table 3.

TABLE 3

| First region (First slurry) | | | Second region (Second slurry) | | | | Cell capacity | Cycle characteristics |
|---|---|---|---|---|---|---|---|---|
| $SiO_x$ | LSX | w11/w12 | $SiO_x$ | LSX | w21/w22 | W1/W2 | (index) | (index) |
| C1 | 100% | 0% | ∞ | 0% | 100% | 0 | 1 | 100 | 100 |
| C2 | 70% | 30% | 2.3 | 30% | 70% | 0.43 | 1 | 100 | 100 |
| C3 | 0% | 100% | 0 | 100% | 0% | ∞ | 1 | 100 | 100 |
| C4 | 50% | 50% | 1 | 50% | 50% | 1 | 1 | 100 | 100 |
| C5 | 100% | 0% | ∞ | 100% | 0% | ∞ | 1 | 80 | 105 |
| C6 | 0% | 100% | 0 | 0% | 100% | 0 | 1 | 110 | 80 |
| C7 | 30% | 70% | 0.43 | 70% | 30% | 2.3 | 1 | 100 | 100 |

From Table 3, it can be understood that the deterioration of the cyclic characteristics is a peculiar phenomenon when the open-circuit potential of the negative electrode is 70 mV or less with respect to a lithium-metal at a fully charged condition.

INDUSTRIAL APPLICABILITY

The secondary battery according to the present invention is useful as a main power supply for a mobile communication device, a portable electronic device or the like.

While the invention has been described with respect to presently preferred embodiments, such disclosure should not be construed as limiting. Various variations and modifications will certainly become apparent to those skilled in the art belonging to the present invention upon reading the above disclosure. Accordingly, the appended claims are to be construed as encompassing all variations and modifications without departing from the true spirit and scope of the invention.

REFERENCE SIGNS LIST

1: Electrode group, 2: Positive electrode lead, 3: Negative electrode lead, 4: Battery case, 5: Sealing plate, 6: Negative electrode terminal, 7: Gasket, 8: Sealing plug, 11: Negative electrode current collector, 12: Negative electrode mixture layer, 12a: First region, 12b: Second region

The invention claimed is:
1. A non-aqueous electrolyte secondary battery including a positive electrode, a negative electrode, an electrolyte and a separator disposed between the positive electrode and the negative electrode,
the negative electrode including a negative electrode mixture layer having a thickness T and a negative electrode current collector carrying the negative electrode mixture layer,
the negative electrode active material including a carbon material and a Si-containing material,
the Si-containing material including a first composite material and a second composite material different from the first composite material,
the first composite material including a silicon oxide phase and a first Si particles dispersed in the silicon oxide phase, wherein when the negative electrode mixture layer is divided into a first region having a thickness of T/2 on the surface side of the negative electrode and a second region having a thickness of T/2 on the negative electrode collector side, a ratio of a mass w11 of the first composite material contained in the first region to a mass w12 of the second composite material contained in the first region: w11/w12 is greater than 1, a ratio of a mass w21 of the first composite material contained in the second region to a mass w22 of the second composite material contained in the second region: w21/w22 is less than 1, and, in a fully charged condition, an open circuit potential of the negative electrode is 0 V or more and 70 mV or less with respect to a lithium metal.

2. The non-aqueous electrolyte secondary battery according to claim 1, wherein, the ratio of a mass W1 of the first composite material contained in the negative electrode mixture layer to a mass W2 of the second composite material contained in the negative electrode mixture layer:

W1/W2 is from 1.0/19.0 to 19.0/1.0.

3. The non-aqueous electrolyte secondary battery according to claim 1, wherein, the second composite material includes a lithium-ion conductive phase and second Si particles dispersed in the lithium-ion conductive phase, the lithium-ion conductive phase is a silicate phase and/or a carbon phase, and the silicate phase includes at least one selected from the group consisting of group 1 elements and group 2 elements of a long period type periodic table.

4. The non-aqueous electrolyte secondary battery according to claim 1, wherein an irreversible capacity of the first composite material is larger than an irreversible capacity of the second composite material.

5. The non-aqueous electrolyte secondary battery according to claim 1, wherein an average particle diameter of the second Si particles is 100 nm or more and 500 nm or less.

6. The non-aqueous electrolyte secondary battery according to claim 1, wherein a ratio of a capacity Cn of the negative electrode to a capacity Cp of the positive electrode: Cn/Cp is greater than 0 and less than 1.

7. The non-aqueous electrolyte secondary battery according to claim 1, wherein a ratio of a mass Wc of the carbon material contained in the negative electrode mixture layer to a mass Ws of the Si-containing material contained in the negative electrode mixture layer: Wc/Ws is from 70/30 to 99/1.

8. The non-aqueous electrolyte secondary battery according to claim 1, wherein a content of the first Si particles contained in the first composite material is 20 mass % or more and 60 mass % or less.

9. The non-aqueous electrolyte secondary battery according to claim 1, wherein a content of the second Si particles contained in the second composite material is 40 mass % or more and 80 mass % or less.

* * * * *